United States Patent [19]

Schnell

[11] 3,997,683

[45] Dec. 14, 1976

[54] METHOD TO IMPROVE THE PHYSICAL ORGANOLEPTICAL AND FUNCTIONAL PROPERTIES OF FLOUR-BASED PRODUCTS THROUGH THE USE OF YEAST AND PRODUCT OF SAID METHOD

[75] Inventor: Philip George Schnell, Wheaton, Ill.

[73] Assignee: Standard Oil Company, Chicago, Ill.

[22] Filed: June 20, 1976

[21] Appl. No.: 588,678

[52] U.S. Cl. ................................ 426/552; 426/549; 426/19; 426/62
[51] Int. Cl.² ........................................ A21D 10/04
[58] Field of Search ............. 426/552, 21, 19, 555, 426/554, 62

[56] References Cited

UNITED STATES PATENTS

| | | | |
|---|---|---|---|
| 1,042,647 | 10/1912 | Castle | 426/62 |
| 1,863,277 | 6/1932 | McGroarty | 426/19 |
| 2,197,820 | 4/1940 | Voss | 426/19 |
| 3,479,188 | 11/1969 | Thelen | 426/19 |

*Primary Examiner*—Raymond N. Jones
*Attorney, Agent, or Firm*—Werten F. W. Bellamy; Arthur G. Gilkes; William T. McClain

[57] ABSTRACT

Yeast or yeast saturated with vegetable oil is incorporated into batter, breading and meat-filler flour-based products resulting in improved physical, organoleptical and functional properties of said products.

11 Claims, No Drawings

METHOD TO IMPROVE THE PHYSICAL ORGANOLEPTICAL AND FUNCTIONAL PROPERTIES OF FLOUR-BASED PRODUCTS THROUGH THE USE OF YEAST AND PRODUCT OF SAID METHOD

BACKGROUND OF THE INVENTION

This invention relates generally to the incorporation of yeast or yeast saturated with vegetable oil into batter, breading and meat-filler flour-based products. More specifically, by the incorporation of the yeast protein containing material into the aforementioned flour-based products, products having improved nutritional value, improved flavor and other improvements in properties are obtained.

Presently, there is much attention being directed toward the development of new sources of proteinaceous material which can be incorporated in flour-based products to improve their processibility. In this connection, the food industry for many years has been looking for an ingredient which could correct the damage incurred by products during processing procedures such as freezing and retorting. In these processing procedures fried goods and other products with high flour content have a tendency to gelatinize or become brittle. Moreover, when high concentrations of flour products (fillers) are added to meat products a starchy flavor and appearance results. In the past, soy flour has been added to flour products. However, the addition of soy flour intensifies the starch flavor. A stable brown color is desired in fried foods. However, the caramel color normally produced in fried foods is not stable unless paprika is used in the flour-based product. The problem here is that the use of paprika is expensive. Additionally, the fried foods industry has converted a puffed batter which requires the use of chemicals such as baking soda and glucono-delta-lactone. The use of these chemicals creates inventory problems and, with the trend toward natural foods, would give rise to difficulties in labeling. Finally, adhesion of batter has always been a problem in fried foods. Surprisingly, it has been found that the addition of yeast or yeast saturated with vegetable oil at a level of 3 to 10 percent helps to alleviate these problems.

SUMMARY OF THE INVENTION

According to this invention, there is provided a process for improving the physical, organoleptical and functional properties of batter, breading and meat-filler flour-based products through the addition of yeast or yeast saturated with vegetable oil. More specifically, it has been found that the yeast material (1) clarifies the flavor of the flour, thereby permitting the product flavor to come through, (2) adds structure and resiliance to breading and fillers, thus enabling them to withstand moist heat and freeze-thaw cycles, (3) produces a stable red-brown color, (4) when saturated with vegetable oil gives a puffed fried batter product, and (5) when used directly on the product before battering or adding into the batter increases adhesion of the batter to the fried product. These significant and beneficial qualities are in addition to the advantages gained in nutrition.

The materials battered with the flour-based products of this invention are fried at temperatures ranging from about 360° to 400° F. for a period of about 1 to about 5 minutes.

By practicing the process of this invention, therefore, one can prepare a flour-based product containing a yeast or yeast saturated with vegetable oil having improved physical, organoleptical and functional properties.

DESCRIPTION OF THE PREFERRED EMBODIMENTS

The process of this invention is especially designed to provide a method for improving the physical, organoleptical and functional properties of flourbased products by adding (1) yeast, or (2) yeast saturated with vegetable oil, to said product.

In general, the process of this invention involves (1) adding spray dried yeast to batters at levels ranging from 3 to 10% based on the weight of the batter formulation, (2) adding spray dried yeast to batters at levels ranging from 3 to 10 percent based on the weight of the batter formulation which have been saturated with vegetable oil in order to entrap the air within the yeast thereby obtaining puffing properties, and (3) adding yeast saturated with vegetable oil to breadings and fillers, followed by baking and drying and then grinding to the desired size. The process of this invention contemplates adding 3 to 10 percent yeast based on the weight of the flour-based product. The yeast material can be in its spray dried form or saturated with vegetable oil. Typically, the yeast material can be added to a flour-based product consisting of (1) 20 to 25 percent All purpose flour, (2) 15 to 22 percent Cake flour, (3) 0.15 to 0.20 percent Baking soda, (4) 0.45 to 0.55 percent Table salt, and (5) 55 to 65 percent water. Especially preferred flour-based products consist of (1) 21 to 23 percent All purpose flour, (2) 18 to 20 percent Cake flour, (3) 0.16 to 0.18 percent Baking soda, (4) 0.50 to 0.53 percent Table salt, and (5) 58 to 60 percent water having 3 to 6 percent yeast, particularly 3 percent or 3 to 10 percent yeast saturated with vegetable oil, particularly 3, 5 and 7%. The yeast material is selected from the above said preferred yeasts, *Candida utilis* being especially preferred.

By way of illustration, yeasts such as those listed in Table I are suitable materials in the practice of this invention.

TABLE I - SUITABLE YEASTS

*Candida curvata*
*Candida lipolytica*
*Candida pulcherima*
*Candida utilis*
*Hansenula anomala*
*Oidium lactis*
*Saccharomyces carlsbergensis*
*Saccharomyces cerevisiae*
*Saccharomyces fragilis*
*Trichosporon cutaneum*

The use of *Candida utilis, Saccharomyces cerevisiae, Saccharomyces fragilis,* or *Saccharomyces carlsbergensis* is the preferred yeast material incorporated in the flour-based products of this invention, because each is considered by the U.S. Food and Drug Administration to be suitable for use in food products.

Single cell protein (SCP) suitable for the process of this invention may be grown aerobically in either a batch or continuous manner. Any suitable carbon-affording substrate may be employed although, for purposes of preparing SCP products for use in foods, an ethanol substrate is preferred. Any conventional combination of mineral nutrient elements may be employed. A convenient source of nitrogen is ammonia which may also be supplied to the fermentor as required to maintain the pH of the fermentation broth, preferably within the range from 3.5 to 5.5. Cells which have been grown at a rapid rate usually have a higher nucleic acid content while those grown more slowly tend to have a more permeable cell wall. Either of these types, as well as cells grown under oxygen-limiting or substrate-limiting conditions may be usefully treated according to the present invention to afford improved and acceptable foods and food components suitable for human consumption.

EXAMPLES

The following examples and tables following thereafter are illustrative, without implied limitation, of this invention.

EXAMPLE 1

The following were prepared:

A. Oiled P-10: P-10 is mixed with 37.5% vegetable oil and allowed to absorb.
B. Batter (control):
  62.4 grams All purpose flour
  55.5 grams Cake flour
  0.5 grams Baking soda
  1.5 grams Table salt
  170.0 grams water
C. P-10 batter: batter (control) + 3% P-10 hydrated 1:2.8
D. OP-10 batter: batter (control) + 3% P-10 solvated to 1:1.375 with vegetable oil
E. Predusted basic product: rolled in P-10 and agitated to remove excess
F. Chicken: the chicken was precooked at a slow boil until tender (first and second wing joints)

The basic product (onion and chicken) was dipped in batter, fried at 375° F. for 2 minutes, drained for 1 minute, and allowed to cool. The freeze-thaw samples were frozen and thawed three times and dropped from a height of 5 feet after each freezing, than evaluated.

EXAMPLE II

A. Batter (control)
  624 grams All purpose flour
  555 grams Cake flour
  5 grams Baking soda
  15 grams Table salt
  1,700 grams water
B. P-10 batter: batter (control) + 3% P-10 (35 grams)
C. P-10 batter: batter (control) + 5% P-10 (59 grams)

Each of the batter mixtures (A, B and C) were mixed in a Hobart A 200 mixer until the batter was smooth. The batter was rested for 10 minutes. The basic product (shrimp) was dipped in batter and drained for 3 minutes. The battered shrimp was deep fat fried for 35 seconds at 385° F., frozen immediately and stored overnight. Next, the battered shrimp was deep fat fried at 385° F. for 2 minutes and tested.

TABLES

SUMMARY STATEMENT

Amoco Torula yeast has a beneficial effect in batter fried products and on their freeze-thaw stability. The yeast's contributing properties are browning, increased batter up-take, batter binding, crispness, puffing ability, even distribution of batter and improved flavor.

OBJECT

The object was to determine the effect of yeast and oil saturated yeast on fried goods.

RESULTS AND CONCLUSIONS

TABLE 1

Effect of 3% P-10, 3% Oil Saturated P-10 and Predusting on Fried Goods (Onions and Chicken)

| Properties Studied | Control | 3% P-10 | 3% Oil Saturated P-10 | Predusting with P-10 |
|---|---|---|---|---|
| Color | White | Golden Brown | Golden Brown | White |
| Batter Uptake | — | Increased | Increased | Very Increased |
| Binding | — | Increased | Increased | Very Increased |
| Crispness | — | + | + | NE |
| Puffing Ability | — | NE | Increased | NE |
| Distribution | Scattered | Even | Even | Even |
| Oil Retention | Greasy | Slight Shine | Slight Shine | NE |
| Flavor | Raw Flour | Clear | Clear | NE |

TABLE 2

Effect of Increasing Concentration of Oil Saturated P-10 on Fried Goods (Onions and Chicken)

| | Control | 3% OP-10 | 5% OP-10 | 7% OP-10 |
|---|---|---|---|---|
| Color | White | Golden Brown (+) | Golden Brown (++) | Golden Brown (+++) |
| Batter Uptake | — | + | + | + |
| Binding | — | + | + | + |
| Cripness |  |  |  |  |
| 0 Time | — | + | + | + |
| 3 Hours | — | + | + | + |
| Oil Retention | Greasy | + | ++ | +++ |

TABLE 2-continued

Effect of Increasing Concentration of Oil Saturated P-10 on Fried Goods (Onions and Chicken)

|  | Control | 3% OP-10 | 5% OP-10 | 7% OP-10 |
|---|---|---|---|---|
| Flavor | Raw Flour | Clear (+) | Clear (++) | Clear (+++) |

− Control Level
+ Improved over control level
NE No Effect

TABLE 3

EFFECT OF P-10 CONTENT ON THE PERFORMANCE OF SHRIMP BATTERS

| Property | Batter | | |
|---|---|---|---|
|  | Control | 3% P-10 | 5% P-10 |
| Color | Light tan | Golden Brown | Golden brown, deeper red |
| Binding Cold | Flake off | Tight & flexible | Tight & flexible |
| Hot | Loose | Tight | Tight |
| Distribution | Thin uncovered spots, shrimp red clearly defined | Complete cover, shrimp red reduced | Complete cover, shrimp red covered |
| Batter Consistency (72° F.) | Flowable | Flowable, slightly gelatinized | Flowable, gelatinized (like raw albumin) |
| Flavor, Odor, Texture | Slightly starchy & pastry | Cleared starch, slightly buttery & more definite shrimp, uniform bite | Cleared starch, butter flavor & odor, definite shrimp, uniform bite |
| *Batter Uptake | 22% | 23% | 24% |
| Cooked | Easily removed | Difficult to remove, some remained | Difficult to remove, some remained |
| **Fat (Oil) Uptake | | | |
| Total Product | 4% | 3% | 3% |
| Batter | 19% | 16% | 16% |
| Surface Appearance | Shiny | Dry | Dry |

*Batter Uptake - The batter from a weighed amount of cooked shrimp was removed and weighed to determine the total amount of batter uptake.
**Fat (Oil) Uptake - The batter was extracted with hexane three times to remove the oil. The oil was then weighed to determine the amount of oil uptake by the batter.

The data in Table 1 indicates that yeast (P-10) at the 3 percent level improves the fried goods in general. The most interesting improvements were the color, flavor, crispness, and binding which were evident in both the frozen and fresh product. The oil saturated yeast added a puffing quality which gave a very pleasing appearance.

Increasing the amount of oil saturated P-10 improved the browning, oil retention, and flavor. This did not produce an off-flavor, but actually removed the raw flour taste with a pleasant egg flavor.

Based on this data, it appears that P-10 has great potential in the fried food industry both from its nutritional, functional, and flavor properties.

The flour-based products of this invention can be used on all fried good requiring either batter and/or breading. Additionally, these products can be incorporated into meal load, patties and other filled meat products.

The many advantages in the use of yeast in breadings, batters, and fillers include their resistance to processing stresses, color formation, resiliance to mechanical stress on the product, clarifying of the flour flavor thereby facilitating the use of higher concentrations of filler, increased functional properties including the encapsulation of flavor into the yeast and increased adhesion.

I claim:

1. A process for improving the physical, organoleptical and functional properties of batter, breading and meat-filler, flour-based products comprising incorporating a single cell protein (SCP) containing material in an amount of 3 to 10 percent based on the weight of said flour-based products, wherein the said material is intended for use in food products, derived from unicellular microorganisms grown in a fermentor aerobically in a suitable fermentation broth, and selected from the group consisting of (1) dried yeast, and (2) dried yeast saturated with vegetable oil which increases adhesion of the batter to the fried product, and adds structure and resiliance to breadings and fillers.

2. The process of claim 1 wherein the composition of the flour-based product consists essentially of (1) 20 to 25 percent all purpose flour, (2) 15 to 22 percent cake flour, (3) 0.15 to 0.20 percent baking soda, (4) 0.45 to 0.55 percent table salt, and (5) 55 to 65 percent water.

3. The process of claim 2 wherein the protein-containing material is yeast in an amount of about 3 to about 6 percent based on the weight of the flour-based product.

4. The process of claim 2 wherein the protein-containing material is yeast saturated with vegetable oil, said material being present in an amount of about 3 to about 10 percent based on the weight of the flour-based product.

5. The process of claim 3 wherein the flour-based product consists essentially of (1) 21 to 23 percent all purpose flour, (2) 18 to 20 percent cake flour, (3) 0.16 to 0.18 percent baking soda, (4) 0.50 to 0.53 percent table salt, and (5) 58 to 60 percent water.

6. The process of claim 4 wherein the flour-based product consists essentially of (1) 21 to 23 percent all purpose flour, (2) 18 to 20 percent cake flour, (3) 0.16 to 0.18 percent baking soda, (4) 0.50 to 0.53 percent table salt, and (5) 58 to 60 percent water.

7. The process of claim 5 wherein the yeast is selected from the group consisting of *Candida utilis*, *Saccharomyces carlsbergensis*, *Saccharomyces cerevisiae*, and *Saccharomyces fragilis*.

8. The process of claim 6 wherein the yeast saturated with vegetable oil is selected from the group consisting of *Candida utilis*, *Saccharomyces carlsbergensis*, *Saccharomyces cerevisiae* and *Saccharomyces fragilis*.

9. The process of claim 7 wherein the amount of yeast is 3%.

10. The process of claim 8 wherein the amount of yeast saturated with vegetable oil is selected from the group consisting of 3, 5 and 7 percent.

11. The flour-based product prepared by the process of claim 1.

* * * * *

UNITED STATES PATENT OFFICE
CERTIFICATE OF CORRECTION

PATENT NO. : 3,997,683
DATED : December 14, 1976
INVENTOR(S) : Philip G. Schnell It is certified that error appears in the above-identified patent and that said Letters Patent are hereby corrected as shown below:

Cover page, "Filed: June 20, 1976" should be
-- Filed: June 20, 1975 --.

Column 2, line 11, "flourbased" should be -- flour-based --.

" 5, " 49, "good" should be -- goods --;
" 5, " 51, "meal load" should be -- meat loaf --.

Signed and Sealed this

First Day of March 1977

[SEAL]

Attest:

RUTH C. MASON
*Attesting Officer*

C. MARSHALL DANN
*Commissioner of Patents and Trademarks*